(12) United States Patent
Joergensen

(10) Patent No.: US 6,178,874 B1
(45) Date of Patent: Jan. 30, 2001

(54) DEVICE FOR PREPARING HOT BEVERAGES AND METHOD FOR PREPARING HOT BEVERAGES USING THE DEVICE

(75) Inventor: Carsten Joergensen, St. Niklausen (CH)

(73) Assignee: PI-Design AG, Triengen (CH)

(*) Notice: Under 35 U.S.C. 154(b), the term of this patent shall be extended for 0 days.

(21) Appl. No.: 09/412,641

(22) Filed: Oct. 5, 1999

(30) Foreign Application Priority Data

Nov. 25, 1998 (EP) .................................................. 98122329

(51) Int. Cl.$^7$ .................................................. A47J 31/047
(52) U.S. Cl. .................................. 99/281; 99/292; 99/303; 426/433
(58) Field of Search .............................. 99/292, 303, 279, 99/281; 426/433; 219/490, 492, 510; 392/445, 460

(56) References Cited

U.S. PATENT DOCUMENTS

| | | | |
|---|---|---|---|
| 2,212,100 | * 8/1940 | Keaton | 99/292 X |
| 2,223,450 | 12/1940 | Jepson et al. | 219/490 |
| 2,287,571 | 6/1942 | Purpura | 219/492 |
| 2,345,264 | * 3/1944 | Jepson | 99/292 |
| 2,576,432 | * 11/1951 | Wilcox | 99/292 X |
| 3,075,453 | * 1/1963 | Wagner et al. | 99/303 X |

FOREIGN PATENT DOCUMENTS

| | | |
|---|---|---|
| 0292649 | 11/1988 | (EP) . |
| 0841030 | 5/1998 | (EP) . |

* cited by examiner

*Primary Examiner*—Reginald L. Alexander
(74) *Attorney, Agent, or Firm*—Nath & Associates; Gary M. Nath

(57) ABSTRACT

A device for preparing beverages of the type having a closed compartment (c2), an open compartment (c1), an ascension pipe (23) connecting the compartments, and a filtering device (f1) between the ascension pipe (23) and the open compartment (c1), has some disadvantages in that an external heating source is needed, thereby increasing the risk of fire and burning the operating persons. Further, the infusion time is either fixed, being decided by the distance between the lower orifice of the ascending pipe and the bottom of the closed compartment or left to the user to estimate. In order to avoid these problems the bottom of the closed compartment (c2) has at least two levels (H1, H4), one level of diminished elevation (H4) in a relatively small area around the lower orifice of the ascension pipe (23), the level (H3) of which is at least below the other elevated level (H1) of a relatively large area, the large area being equipped with electrical heating members (he1, he2) controlled by a switch and at least one temperature sensor (v) for controlling the switch, the large area of the bottom being surrounded by a rim (25) for holding a residual of liquid.

21 Claims, 4 Drawing Sheets

DEVICE FOR PREPARING HOT BEVERAGES AND METHOD FOR PREPARING HOT BEVERAGES USING THE DEVICE

FIELD OF THE INVENTION

The present invention relates to a device for preparing beverages of the type having a closed compartment, an open compartment, an ascension pipe connecting the compartments and a filtering device between the ascension pipe and the open compartment. Further, the invention relates to a method for preparing beverages using the above mentioned device, where liquid is brought to the desired infusion temperature in the closed compartment and is forced by the steam pressure through the ascension pipe and the filtering device to the open compartment containing the aromatic carriers, after which the steam from the remainder of the liquid in the closed compartment condenses in the liquid in the open compartment thereby heating the mixture of liquid and the aromatic carriers to the desired infusion temperature for some time, after which the closed compartment is allowed to cool thereby decreasing the pressure in the closed compartment so as to bring back the beverage by suction of the beverage through the filter and the ascension pipe to the closed compartment leaving the residuals of the aromatic carriers in the open compartment.

BACKGROUND OF THE INVENTION

Such device and method is known from e.g. DK 90776 and 98310 and was developed for about forty years ago. Common to those prior devices is, that for heating the contents of the device an external heating source is needed. Such heating source can be achieved using a spirit lamp or a hotplate, but for some applications such external heating sources might be inappropriate. The use of open fire might increase the risk for fire and other external heating sources with their up-turned hot surfaces might also increase the risk for burning the operating persons or simply melting plastics items unintendedly left on such hot surfaces. Further, the infusion time is either fixed being decided by the distance between the lower orifice of the ascending pipe and the bottom of the closed compartment or left to the user to estimate.

It is commonly known to use liquid heating vessels energized by electricity, and such liquid heating vessel is disclosed in EP 0 841 030 A1. The novel aspect there is, that a heating element is fixed with a sealing flange to the underside of a metal plate which closes the bottom of the vessel. Such heating vessels are because of the sealing means inappropriate for preparing beverages as disclosed in the ingress of the specification, and the inventor has consequently as a goal to solve the disadvantages of the state of the art, thereby minimizing the risks of the prior art.

SUMMARY OF THE INVENTION

To this end the inventor has suggested a device as mentioned in the ingress of the specification, where the bottom of the closed compartment is comprising

- at least two levels, one level of diminished elevation in a relatively small area around the lower orifice of the ascension pipe, the level of which is at least below the other elevated level of a relatively large area,
- said large area being equipped with electrical heating means controlled by switching means and at least one temperature sensitive means for controlling the switching means, said large area of the bottom being surrounded by a rim for holding a residual of liquid.

With the device according to the invention the inventor has eliminated the above mentioned risks of fire and burning and further, some more advantages like the possibility to control the infusion time have been achieved in the multi-level bottom and the electrical operation of the device.

From EP-O 292 649 A1 it is known to have the bottom of the closed compartment split in two sections, an upper and a lower section, where each section has a heating element. This device is aimed at making tea by varying the distance above the lower bottom of the ascension pipe's orifice in order to adjust the infusion time for the tea during which the water at the lower level evaporates.

This prior art, however, is not suited for making e.g. coffee and it is costly to produce, as it contains a relatively large number of parts, particularly the moveable ascension pipe. Further, the ascension pipe must be of a type which is sealingly moveable in order to control the flow of the water/tea. Also, the lower level is equipped with a heating element which means that only boiling water will ascend through the ascension pipe. Thereby the temperature of the water in the upper/open compartment will inevitably never approximate the boiling temperature of the water and the infusion will not meet the goal of performing the infusion at the optimum temperature of the aromatic carriers.

In an embodiment of the invention it is suggested that the heating means comprise at least two different heating means, for differentiated heating supply to the closed compartment. If, further, a temperature sensitive means is functionally connected to a switching means for each heating means, it is possible within narrow limits to keep the beverage at a preferred temperature for drinking, as such temperature control is more adequately achieved by electrical operation than by e.g. a spirit lamp or a hotplate. It should here be understood, that the switching means are mechanically operated, but the switching means can as well be electronically operated. To this end, it is most appropriate having the electronically switching means controlled by at least one micro processor, which is not shown in detail in the drawings.

In another embodiment of the invention it is suggested that the device for preparing beverages comprise means for varying the infusion time, where the variation of the infusion time is controlled electronically by the micro processor through delayed switching on of at least one of the heating means during the cooling-off of the closed compartment.

In another embodiment a variation of the infusion time is achieved by varying the effective height of the rim, so as to vary the contents of the residual liquid to be evaporated.

To this end it is suggested, that a cylindrical lining on the inside of the rim is pivotally and sealingly secured to the rim being of varying height along the circumference, said lining itself being of varying height. Of course, the rim could as well be a lining in a pivotable regulation cylinder, but it seem to be most practical to use the pivotable lining.

The invention further relates a method for preparing beverages using the device according to the invention, the method being of the type as mentioned in the ingress of the specification, where the inventor suggests the following steps:

i. using the heating means of the relatively large area for
  a. heating the liquid in the closed compartment, thereby increasing the pressure in said closed compartment and forcing the liquid to the open compartment and leaving a residual of liquid behind the rim surrounding the relatively large area equipped with the heating means, b. evaporating the residual of liquid behind said rim, thereby maintaining the pressure in the closed compartment by exhausting the steam through the ascension pipe to the open compartment, where the steam condenses in the mixture of liquid and aromatic carriers, heating the mixture to a desired infusion temperature, which is maintained until the evaporation is finished, the duration of which is decided by the volume of the residual of liquid, or the effective height of the rim enclosing the volume of liquid, c. heating the relatively large area of the closed compartment, thereby increasing the temperature until the temperature sensitive means react and switch the circuit supplying the heating means, and ii. by switching off the circuit supplying the heating means of the relatively large area leaving the closed compartment, a. to allow to cool, decreasing the pressure in the closed compartment to a depression, which is used for b. to performing a suction of the beverage from the open compartment through the filter and the ascension pipe to the closed compartment, and c. to leave the carriers of the aroma in the open compartment, iii. switching the heating means to a power state being sufficient to keep the beverage at the desired temperature. By initiating the final switching iii at a delayed time, the returning of the beverage can be advanced so as to shorten the infusion time. This aspect might serve to allow the user to choose a different taste of the beverage.

BRIEF DESCRIPTION OF THE DRAWINGS

Preferred embodiments and methods according to the present invention are disclosed hereinafter by way of non-limiting example with reference to the accompanying drawings in which.

DETAILED DESCRIPTION

Figure 1A:
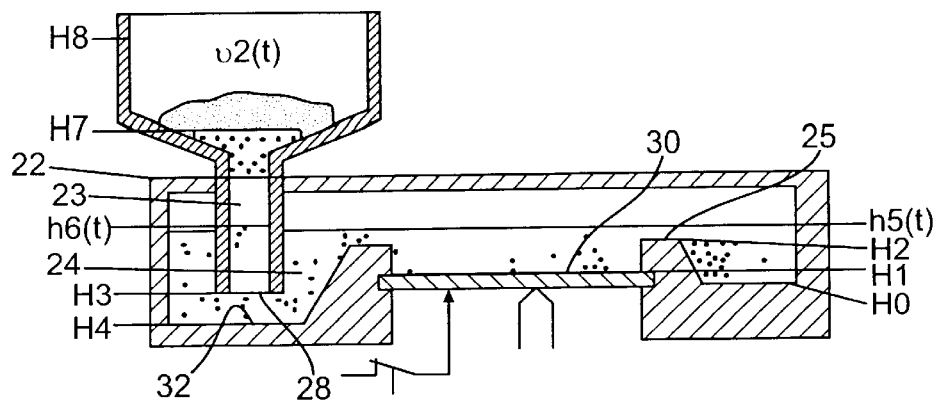
FIGS. 1A–1F are a schematic drawing of the device according to the invention, where the different numbers refer to different stages of the infusion process.
Figure 1B:
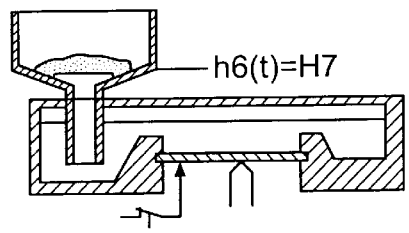
Figure 1C:
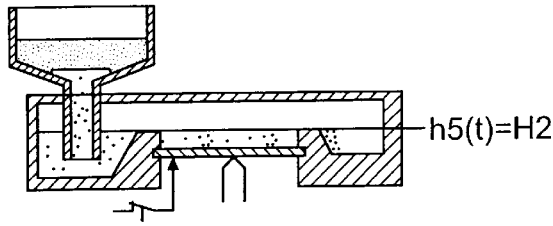
Figure 1D:
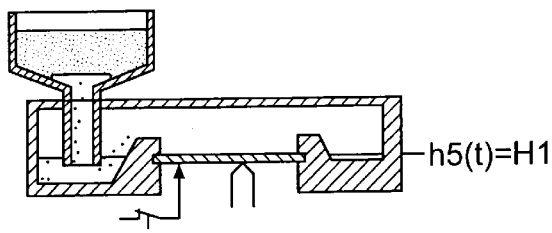
Figure 1E:
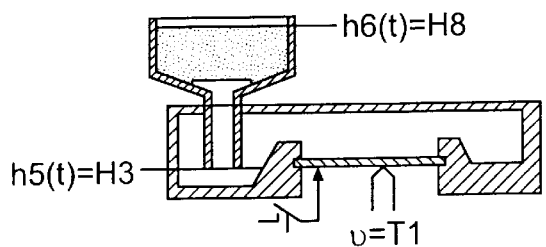
Figure 1F:
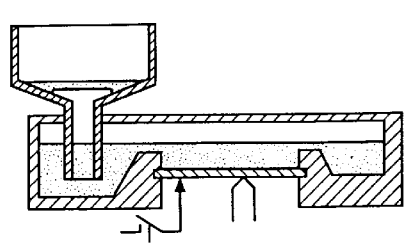
Figure 2A:
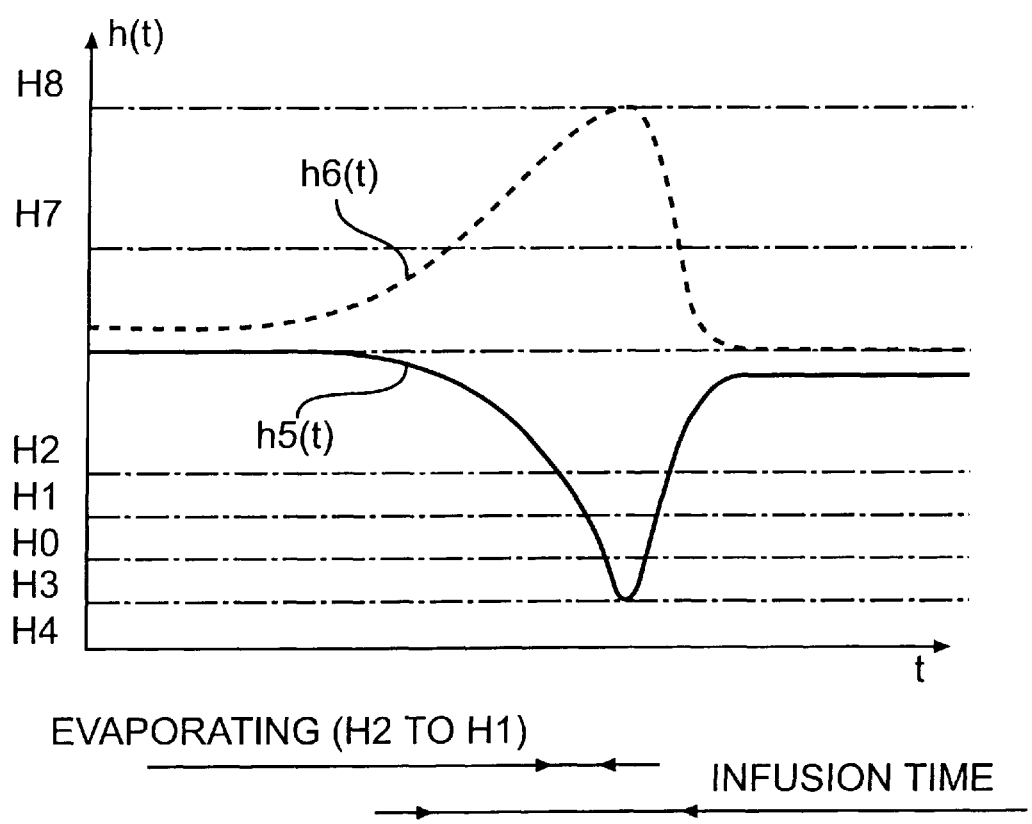
FIGS. 2A–2D are a time scheme for different physical entities of the device according to the invention, where the stages are numbered with reference to FIG. 1.
Figure 2B:
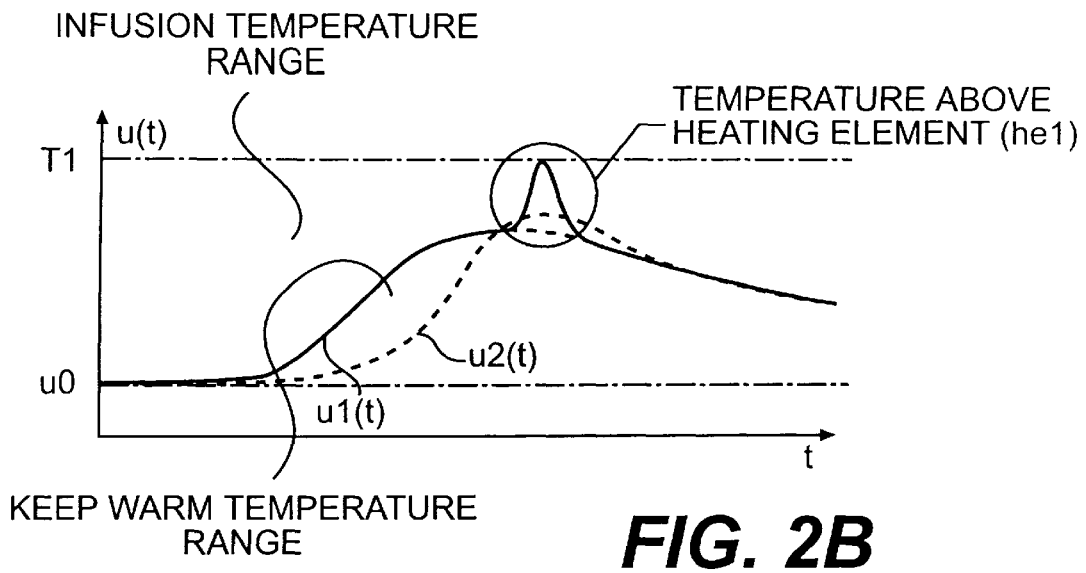
Figure 2C:
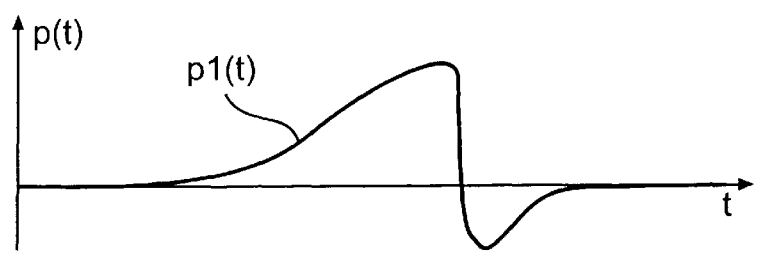
Figure 2D:
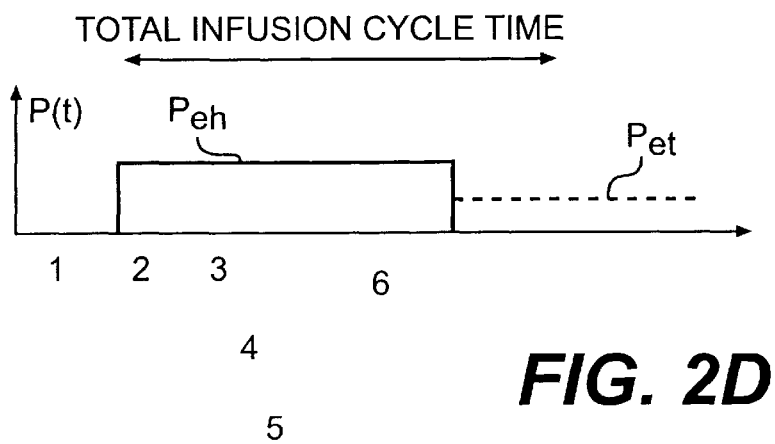

The preparation of beverages is initiated when using a device according to the invention by filling a proper amount of liquid through an inlet 22 into the compartment c2 to be closed by arranging in the inlet 22 the ascension pipe 23 with its lower orifice 28 arranged at a level H3 below the level H1 of the elevated bottom, which ascension pipe is connected to the filter f1 and the open compartment c1, in which the aroma carriers are present. Closed compartment c2 includes a relatively large area 30 having a bottom at a first level identified above as H1, and a small area 32 having a bottom at a second level H4 that is below first level H1, small area 32 being relatively smaller than large area 30. Small area 32 is around lower orifice 28 of ascension pipe 23, and as shown in FIG. 1.1, ascension pipe 23 is arranged eccentrically in relation to large area 30. The temperature J1(t) of the liquid body 24 is normally the temperature of the tap liquid.

FIG. 2 shows a coarse time scheme for different physical entities of the device according to the invention, where the stages are numbered with reference to FIG. 1. The physical entities are from top to bottom:

the liquid levels of the open compartment c1, indicated by h6(t), and the closed compartment c2, indicated by h5(t), the temperatures of the closed compartment c2, indicated by v1(t), and the open compartment c1, indicated by J2(t), the top of the curve v1(t) indicating the time, where all the liquid has evaporated and the bottom is heated until the safety switch is activated the pressure in the closed compartment c2, the electrical power $P_{eh}$ and $P_{el}$ being switched on and off. The situation shown under No. 1 in FIGS. 1 and 2 is present before switching on the heating means he1. The level h5(t) of the liquid body in the closed compartment c2 is because of the capillary effect almost equal to the level h6(t) of the liquid in the ascension pipe 23, as the pressure P1(t) in the closed compartment c2 is equal to the pressure P0 outside the closed compartment c2.

The process of preparing the beverage starts when the heating means he1 are switched on. Thereby the electric power $P_{eh}$ is transformed into heating and is guided to the liquid body 24 thereby increasing the temperature v1(t) of the liquid body 24. The heating means are in this embodiment equipped with at least two temperature sensitive means, where the first temperature sensitive means T1 is a safety switch for controlling the electric power $P_{eh}$, which is the high power for heating and boiling the liquid, and the second temperature sensitive means v, which is for controlling the low level power $P_{el}$ almost balancing the heat loss.

The situation shown under No. 2 in the FIGS. 1 and 2 is caused by increasing the temperature, the steam pressure P1(t) of the liquid body 24 increases likewise and causes the liquid to be pressed into the ascension pipe 23 and further through the filter f1 into the open compartment c1. In the open compartment the liquid is brought into contact with the aroma carriers, which causes the aroma carriers to soften. The temperature in the open compartment is still close to the environmental temperature, so infusion has not started at this stage.

The situation shown under No. 3 in the FIGS. 1 and 2 is present, when the level h5(t) of the liquid body 24 has reached the level H2 of the upper edge of the rim 25, whereby the liquid is being separated in one part being sent through the ascension pipe 23 and another part being left behind the rim 25.

As shown under No. 4 in the FIGS. 1 and 2 this other part, being a small fraction of the total liquid body 24, will very fast be brought to the infusion temperature $v1(t)=v_{max}$ and send the remaining liquid body 24 through the ascension pipe 23. The infusion time is defined as the time, during which the small fraction of liquid evaporates from the larger area of the elevated level and enters the ascending pipe as steam continuing to the open compartment, where the latent heat in the steam at the preferred infusion temperature is used for further heating the contents of the open compartment and keeping the preferred infusion temperature stable.

The situation shown under No. 5 in the FIGS. 1 and 2 is representing the stage, where all the liquid behind the rim 25 has evaporated, and the temperature in the open compartment c1 has reached the infusion temperature $v_{max}$. At this stage the heating means will, in very short time, reach the temperature, where the safety switch T1 reacts and breaks the circuit, that transforms the electrical power $P_{eh}$ into heating, and the switching also turns on the electrical power $P_{el}$ for keeping the beverage at the desired temperature for drinking.

The infusion has now been finished and the beverage shall now be transported from the open compartment to the closed compartment in the shortest possible time, because, when the aromatic carriers have delivered their aroma, the beverage will not gain further taste components if staying in the open compartment.

The transport back to the closed compartment c2 is effected by having the closed compartment c2 cool, thereby decreasing the pressure in the closed compartment c2. When decreasing the pressure a pressure gradient will be present over the filter, which will cause the beverage in the open compartment c1 to be transported back through the ascension pipe 23 to the closed compartment c2. When all the beverage has left the open compartment c1, the situation shown under No. 6 in the FIGS. 1 and 2, is present. After this step, the open compartment c1 and the ascension pipe 23 can be removed, and the beverage is ready for drinking.

In another embodiment it is possible to switch on the electrical power $P_{el}$ at a later time than the switching of the electrical power $P_{eh}$ at the end of the infusion time. Thereby the closed compartment c2 will cool faster and thereby transport the beverage back to the closed compartment c2 at an earlier stage, so as to remove the beverage from the aroma carriers faster than normal.

Figure 3:
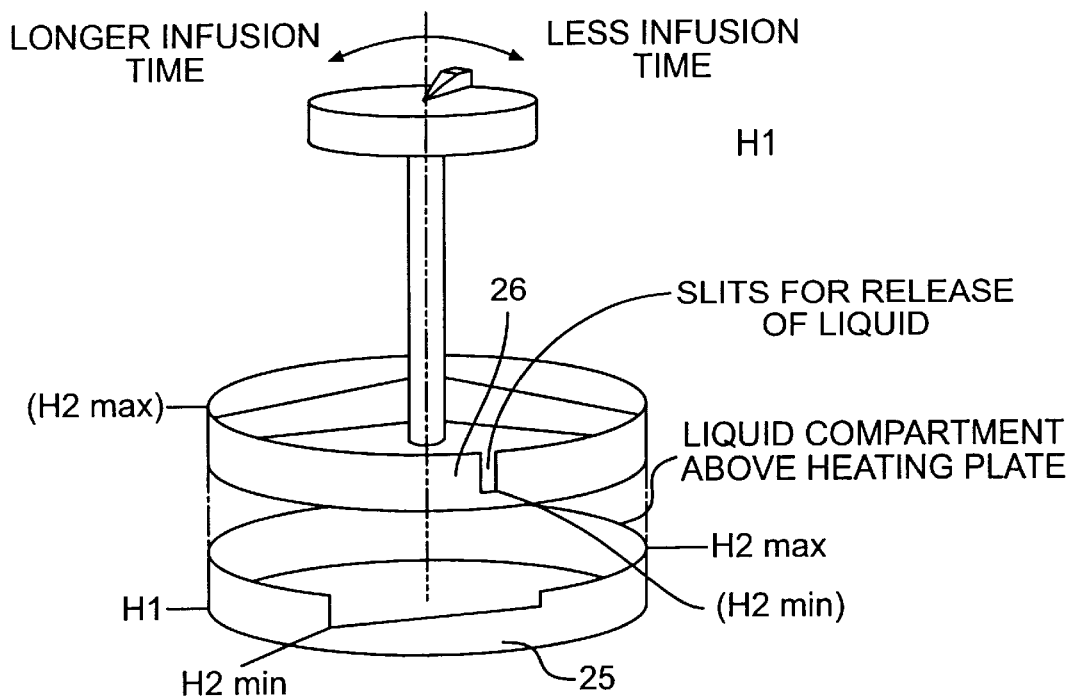
FIG. 3 is a schematic representation of a cylindrical lining on the inside of the rim.
Figure 4:
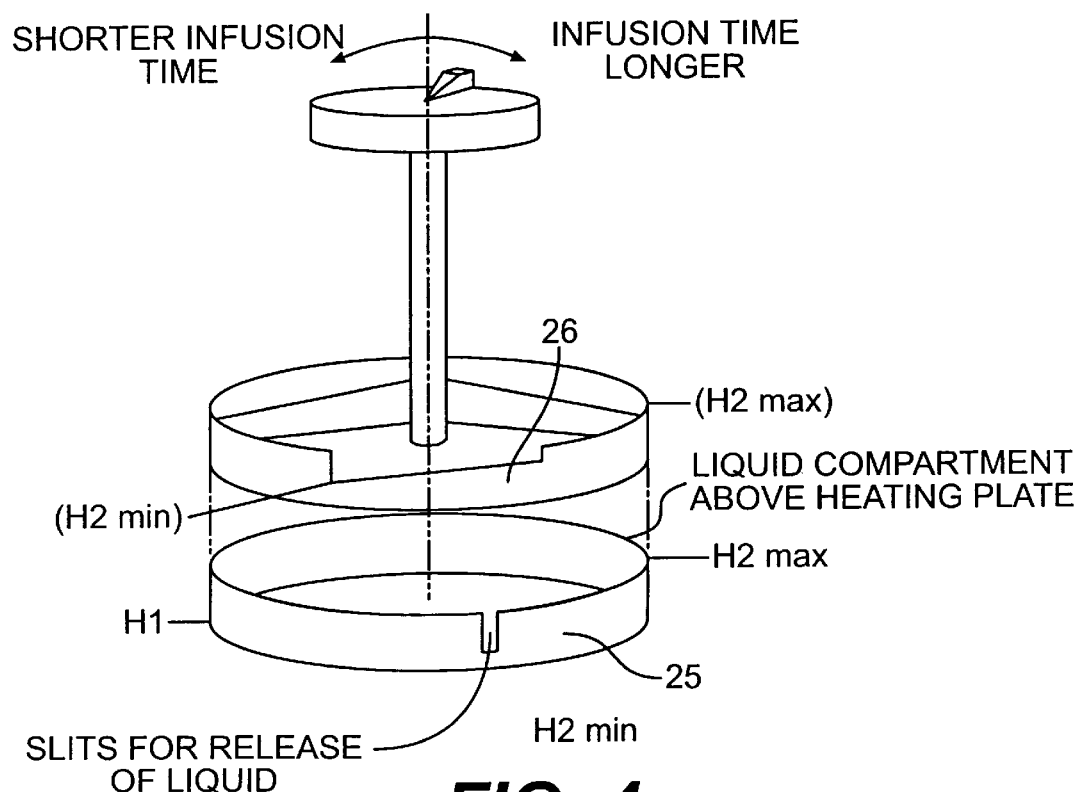
FIG. 4 is another embodiment of the cylindrical lining.

In still another embodiment it is possible to achieve the same variability of infusion time by mechanically varying the effective height of the rim 25. In a preferred embodiment of such arrangement, shown in FIGS. 3 and 4, this is achieved by having a cylindrical lining 26 on the inside of the rim 25 being pivotally secured to the rim 25, which is of varying height along the circumference, said lining 26 itself having a varying height. The varying height of the lining 26 can be made in different ways, and in the preferred embodiment it is made by a slot 27 in the lining as shown in FIG. 3. Of course, the opposite could be used as well as shown in FIG. 4. It should be observed, that the variation here is reversed, so that the infusion time will increase, when the knob is turned clockwise. Also the rim and the lining 26 could be made with continuously varying height, where the variations are mirror symmetrical, respectively. Such embodiment would be represented by the rim 25 of FIG. 3 in combination with the mirrored representation of the lining 26 of FIG. 4.

With said embodiment the variation of the infusion time can be achieved by simply turning a common knob, which in a known manner is connected to the lining 26.

Various modifications may be made in the device and the method. For instance, the electronic switching controlled by a micro processor could very precisely control the temperature decrease necessary for transporting back the beverage to the closed compartment c2, and the mechanical variation of the infusion time could be provided with different means, e.g. by elevating or diminishing the level of the upper edge of the rim 25 in relation to the elevated level H1 of the bottom, or vice versa.

While the invention has been particularly shown and described with reference to preferred embodiments thereof, it will be understood by those skilled in the art that various changes in form and detail may be made therein without departing from the spirit and scope of the invention.

What is claimed is:

1. A device for preparing beverages of the type having a closed compartment, an open compartment, an ascension pipe connecting the compartments and having a lower orifice, and a filtering device between the ascension pipe and the open compartment, whereby said closed compartment includes a bottom, said bottom comprises:
a large area having a bottom portion which defines a first level, and
a small area smaller than said large area and having a bottom portion which defines a second level, said small area being around the lower orifice of the ascension pipe, said second level being at least below said first level of said large area, and said ascension pipe lower orifice defines a third level, said third level being below said first level, said closed compartment further includes a rim surrounding said large area and defining a reservoir for holding a residual of liquid, said large area further comprising at least a first and a second electrical heater capable of providing a differentiated heating supply to said closed compartment, said at least first and second electrical heater each being controlled by corresponding ones of a switch connected to said at least first and second electrical heater and at least one temperature sensor that controls said switch, wherein said temperature sensor is functionally connected to said switch and said switch is electronically operated; and wherein said ascension pipe is arranged eccentrically in relation to said large area.

2. A device for preparing beverages according to claim 1, wherein at least one of said corresponding ones of said electronically operated switches is controlled by at least one micro processor.

3. A device for preparing beverages according to claim 1, wherein a means is provided for varying an infusion time.

4. A device for preparing beverages according to claim 3, wherein the variation of the infusion time is controlled electronically by a micro processor through a delayed switching on of at least one of said first and second electrical heater during a cooling-off of said closed compartment.

5. A device for preparing beverages according to claim 3, wherein an effective height of said rim can be varied, so as to vary a volume of the residual of liquid and thereby vary said infusion time.

6. A device for preparing beverages according to claim 5, further comprising a cylindrical lining aligned and disposed coaxial with and adjacent to said rim, said lining being pivotally and sealingly secured to said rim, wherein said rim is of varying height around its circumference, and said lining is of varying height around its circumference, whereby rotation of said lining in relation to said rim varies said effective height.

7. A device for preparing beverages comprising:
a closed compartment;
an open compartment;
an ascension pipe connecting the compartments, said ascension pipe having a lower orifice; and
a filtering device between said ascension pipe and said open compartment, whereby said closed compartment includes a bottom, said bottom comprises:
a large area having a bottom portion which defines a first level, and
a small area smaller than said large area and having a bottom portion which defines a second level, said small area being around the lower orifice of the ascension pipe, said second level being at least below said first level of said large area, and said ascension pipe lower orifice defines a third level, said third level being below said first level, said closed compartment further includes a rim surrounding said large area and partially separating said large area from said small area, said rim defining a reservoir for holding a residual of liquid;

an electrical heater that heats said large area;
a switch device which controls said electrical heater; and
a temperature sensor which controls said switch device.

8. A device for preparing beverages as claimed in claim 7, and further including a means for varying an infusion time.

9. A device for preparing beverages as claimed in claim 8, wherein said varying means comprises a micro processor which electronically controls the variation of the infusion time through a delayed switching on of said electrical heater during a cooling-off of said closed compartment.

10. A device for preparing beverages as claimed in claim 8, wherein said varying means comprises a means for varying an effective height of said rim, so as to vary a volume of the residual of liquid and thereby vary said infusion time.

11. A method for preparing beverages in which liquid is brought to a desired infusion temperature in a closed compartment and is forced by steam pressure through an ascension pipe and through a filtering device to an open compartment containing aromatic carriers, after which the steam from the residual of the liquid in the closed compartment condenses in the liquid in the open compartment heating the mixture of liquid and the aromatic carriers to the desired infusion temperature for some time, after which the closed compartment is allowed to cool thereby decreasing the pressure in the closed compartment so as to bring back the beverage by suction of the beverage through a filter and a pipe to the closed compartment leaving the residuals of the aromatic carriers in the open compartment comprising the steps of:
  i. using a heating means in a relatively large area for
     a. heating the liquid in the closed compartment, thereby increasing the pressure in said closed compartment and forcing the liquid to an open compartment and leaving a residual of liquid behind a rim surrounding a relatively large area equipped with the heating means,
     b. evaporating the residual of liquid behind said rim, thereby maintaining the pressure in the closed compartment by exhausting the steam through the ascension pipe to the open compartment, where the steam condenses in the mixture of liquid and aromatic carriers, heating the mixture to a desired infusion temperature, which is maintained until the evaporation is finished, the duration of which is decided by the volume of the residual of liquid, or the effective height of the rim enclosing the volume of liquid,
     c. heating the relatively large area of the closed compartment, thereby increasing the temperature until the temperature sensitive means reacts and switches the circuit supplying the heating means, and
  ii. switching of a circuit supplying the heating means of the relatively large area, thereby having the closed compartment,
     a. allowed to cool, decreasing the pressure in the closed compartment to a depression, which is used for
     b. performing a suction of the beverage from the open compartment through the filter and the ascension pipe to the closed compartment, and
     c. leaving the carriers of the aroma in the open compartment,
  iii. switching the heating means to a power state being sufficient to keep the beverage at the desired temperature.

12. A method for preparing beverages according to claim 11, where the infusion time is dependent on the height of the rim.

13. A method for preparing beverages according to claim 11, where the temperature sensitive element, at the end of the evaporation of the residual liquid, will detect a sharp rise in the temperature and consequently switches the circuit containing the heating elements, and leaving the closed compartment to cool at a rate partly decided by the electrical power delivered to the heating means.

14. A method for preparing beverages according to claim 13, where the electrical power delivered to the heating means is less than the heat loss of the closed compartment, when cooling.

15. A method for preparing beverages according to claim 12, where the height of the rim is varied, so as to vary the contents of the residual liquid thereby varying the infusion time.

16. A method for preparing beverages according to claim 15, where the cylindrical lining on the inside of the rim is pivotally secured to the rim being of varying height along the circumference, said lining itself being of varying height.

17. A device for preparing beverages comprising:
a closed compartment;
an open compartment;
an ascension pipe connecting the compartments, said ascension pipe having a lower orifice; and
a filtering device between said ascension pipe and said open compartment,
whereby said closed compartment includes a bottom, said bottom comprises:
  a large area having a bottom portion which defines a first level, and
  a small area smaller than said large area and having a bottom portion which defines a second level, said small area being around the lower orifice of the ascension pipe, said second level being at least below said first level of said large area, and said ascension pipe lower orifice defines a third level, said third level being below said first level,
said closed compartment further includes a rim surrounding said large area and defining a reservoir for holding a residual of liquid,
an electrical heater that heats said large area;
a switch device which controls said electrical heater;
a temperature sensor which controls said switch device; and
means for varying an infusion time.

18. The device for preparing beverages as claimed in claim 17, and further comprising:
a micro processor that electronically controls the infusion time through delayed switching of said electrical heater during a cooling-off of said closed compartment.

19. The device for preparing beverages as claimed in claim 17, and further comprising means for varying a height of said rim so as to vary a volume of the residual of liquid and thereby vary the infusion time.

20. The device for preparing beverages as claimed in claim 19, and further comprising a cylindrical lining on an inside of said rim, said cylindrical lining being pivotally and sealingly secured to said rim and being of varying height; and
wherein said rim is of varying height along the circumference thereof.

21. A device for preparing beverages comprising:
a closed compartment;
an open compartment;
an ascension pipe connecting the compartments, said ascension pipe having a lower orifice; and
a filtering device between said ascension pipe and said open compartment, whereby said closed compartment includes a bottom, said bottom comprises:
- a large area having a bottom portion which defines a first level, and
- a small area smaller than said large area and having a bottom portion which defines a second level, said small area being around the lower orifice of the ascension pipe, said second level being at least below said first level of said large area, and said ascension pipe lower orifice defines a third level, said third level being below said first level, said closed compartment further includes a rim surrounding said large area and defining a reservoir for holding a residual of liquid, an electrical heater that heats said large area;

an electronic switch device which controls said electrical heater;

a micro processor that controls said electronic switch device; and a temperature sensor which controls said switch device.

* * * * *